(12) United States Patent
Tokunaga

(10) Patent No.: US 11,180,089 B2
(45) Date of Patent: Nov. 23, 2021

(54) CAMERA MOUNTING STRUCTURE

(71) Applicant: TOYOTA JIDOSHA KABUSHIKI KAISHA, Aichi-ken (JP)

(72) Inventor: Yutaka Tokunaga, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 29 days.

(21) Appl. No.: 16/726,243

(22) Filed: Dec. 24, 2019

(65) Prior Publication Data

US 2020/0247330 A1 Aug. 6, 2020

(30) Foreign Application Priority Data

Feb. 6, 2019 (JP) .............................. JP2019-020026

(51) Int. Cl.
*B60R 11/04* (2006.01)
*G03B 17/56* (2021.01)
*B60J 1/00* (2006.01)
*B60R 11/00* (2006.01)

(52) U.S. Cl.
CPC ............... *B60R 11/04* (2013.01); *B60J 1/002* (2013.01); *G03B 17/561* (2013.01); *B60R 2011/0026* (2013.01)

(58) Field of Classification Search
CPC .................................. B60R 11/04; B60T 1/002
See application file for complete search history.

(56) References Cited

U.S. PATENT DOCUMENTS

2017/0205625 A1* 7/2017 Wehninck ................ H05B 3/20
2019/0170545 A1 6/2019 Higashimachi et al.

FOREIGN PATENT DOCUMENTS

JP 2014-101004 A 6/2014
JP 2019-99046 A 6/2019

* cited by examiner

*Primary Examiner* — Minh Q Phan
(74) *Attorney, Agent, or Firm* — Hauptman Ham, LLP

(57) ABSTRACT

A camera mounting structure includes: a camera that is provided on a vehicle upper side of an inner surface of a front windshield glass and detects information about the surroundings of a vehicle; an angle-of-view hood member that is disposed on the vehicle front lower side of the camera; a heating element that is provided on a lower surface of the angle-of-view hood member and is for defogging the front windshield glass; and a heat-insulating member that is provided on a lower surface of the heating element and has a two-layer structure having an upper-layer heat-insulating material and a lower-layer heat-insulating material.

6 Claims, 7 Drawing Sheets

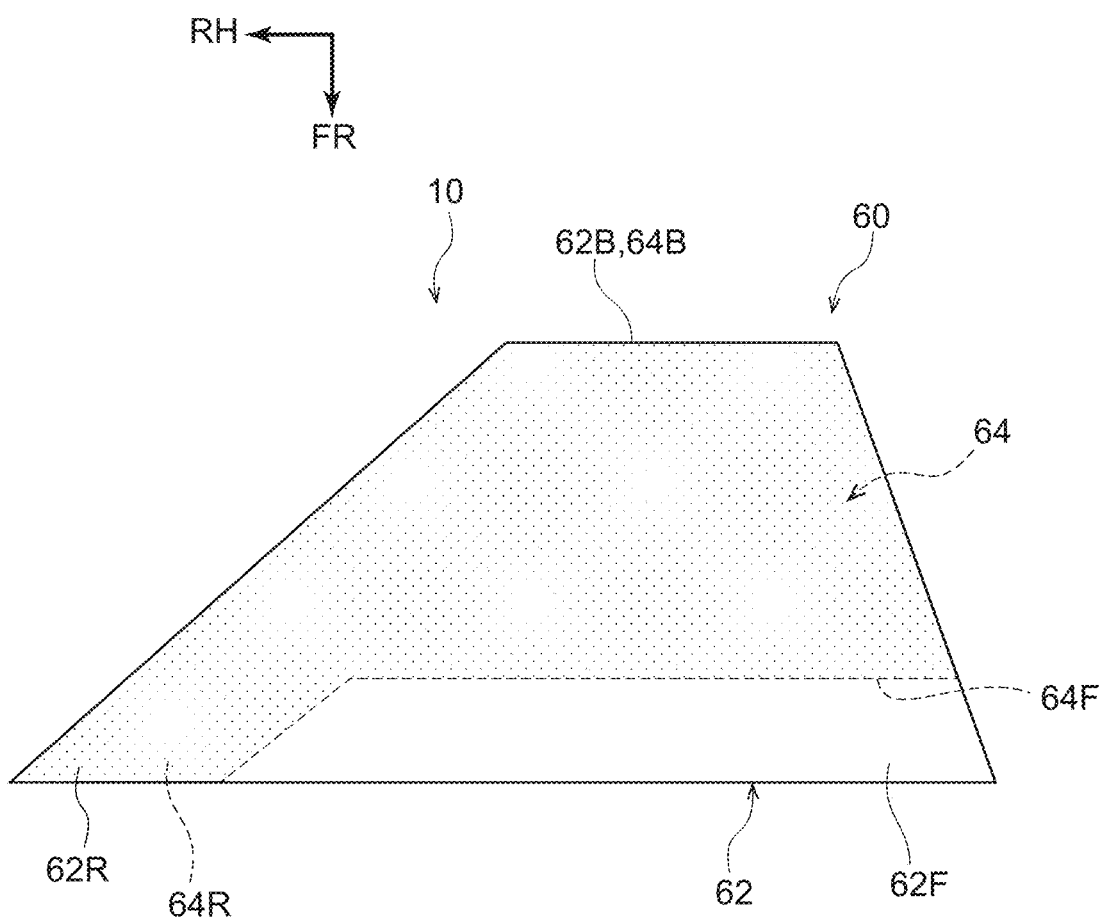

CAMERA MOUNTING STRUCTURE

CROSS-REFERENCE TO RELATED APPLICATION

This application is based on and claims priority under 35 USC 119 from Japanese Patent Application No. 2019-020026 filed on Feb. 6, 2019, the disclosure of which is incorporated by reference herein.

BACKGROUND

Technical Field

The present disclosure relates to a camera mounting structure.

Related Art

Conventionally, a structure is known where a camera is disposed in close proximity to a front windshield glass of a vehicle and where a heating device (a heating element such as a hot wire heater) for defogging the front windshield glass is disposed in close proximity to the camera (e.g., see Japanese Patent Application Laid-open (JP-A) No. 2014-101004).

SUMMARY

In this kind of structure, it is also conventionally known to provide a heat-insulating member on the lower surface side (the side not opposing the front windshield glass) of the heating element to inhibit heat radiation from the lower surface side of the heating element. However, it is desired that the heat-insulating member be formed as slim as possible from the standpoint of ensuring the visibility of the occupants (the driver, etc.).

Thus, it is an object of the present disclosure to obtain a camera mounting structure that can inhibit the visibility of the occupants from being reduced by a heat-insulating member provided on a heating element for defogging a front windshield glass having a camera disposed in close proximity thereto.

In order to achieve the above object, a camera mounting structure of a first aspect of the disclosure includes: a camera that is provided at a vehicle upper side of an inner surface of a front windshield glass and detects information about surroundings of a vehicle; an angle-of-view hood member made of metal that is disposed at a vehicle front lower side of the camera; a heating element that is provided at a lower surface of the angle-of-view hood member and is for defogging the front windshield glass; and a heat-insulating member that is provided at a lower surface of the heating element and has a two-layer structure having an upper-layer heat-insulating material and a lower-layer heat-insulating material.

According to the camera mounting structure of the first aspect, the heat-insulating member provided at the lower surface of the heating element for defogging the front windshield glass has the two-layer structure having the upper-layer heat-insulating material and the lower-layer heat-insulating material. Consequently, it becomes possible to adjust, with the respective layers, the material and length of the heat-insulating member. Namely, it becomes possible to slim the heat-insulating member compared to a case where the heat-insulating member has a one-layer structure, and the visibility of the occupants is inhibited from being reduced by the heat-insulating member.

A camera mounting structure of a second aspect of the disclosure is the camera mounting structure of the first aspect, wherein the upper-layer heat-insulating material of the heat-insulating member projects in a vehicle forward direction beyond the lower-layer heat-insulating material, and part of a sensor that detects information about the surroundings of the vehicle is disposed at a vehicle lower side of the upper-layer heat-insulating material and at a vehicle front side of the lower-layer heat-insulating material.

According to the camera mounting structure of the second aspect, the upper-layer heat-insulating material projects in the vehicle forward direction beyond the lower-layer heat-insulating material, and part of the sensor is disposed at the vehicle lower side of the upper-layer heat-insulating material and on the vehicle front side of the lower-layer heat-insulating material. Consequently, even in a case where the sensor is provided in addition to the camera, the length in the vehicle front and rear direction from the camera to the sensor is reduced, and installation space for installing the camera and the sensor is saved. Thus, the visibility of the occupants is inhibited from being reduced.

A camera mounting structure of a third aspect is the camera mounting structure of the first aspect or the second aspect, wherein the upper-layer heat-insulating material is formed in a size that is larger than the heating element and smaller than the angle-of-view hood member as seen in a plan view.

According to the camera mounting structure of the third aspect, the upper-layer heat-insulating material is formed in a size that is larger than the heating element and smaller than the angle-of-view hood member as seen in a plan view. Consequently, the heat of the heating element is effectively inhibited from radiating in the vehicle downward direction, and the angle-of-view hood member made of metal is efficiently heated. Namely, defogging performance with respect to the front windshield glass is enhanced.

A camera mounting structure of a fourth aspect is the camera mounting structure of the third aspect, wherein the upper-layer heat-insulating material is formed in substantially a same shape as the angle-of-view hood member as seen in a plan view.

According to the camera mounting structure of the fourth aspect, the upper-layer heat-insulating material is formed in substantially the same shape as the angle-of-view hood member as seen in a plan view. Consequently, the heat of the heating element is more effectively inhibited from radiating in the vehicle downward direction, and the angle-of-view hood member made of metal is heated even more efficiently.

As described above, according to the camera mounting structure of the disclosure, the visibility of the occupants can be inhibited from being reduced by a heat-insulating member provided on a heating element for defogging a front windshield glass having a camera disposed in close proximity thereto.

BRIEF DESCRIPTION OF THE DRAWINGS

A preferred embodiment will be described in detail based on the following figures, wherein:

FIG. 7 is a plan view schematically showing an example modification of the heat-insulating member configuring the camera mounting structure pertaining to the embodiment.

DETAILED DESCRIPTION

Figure 1:
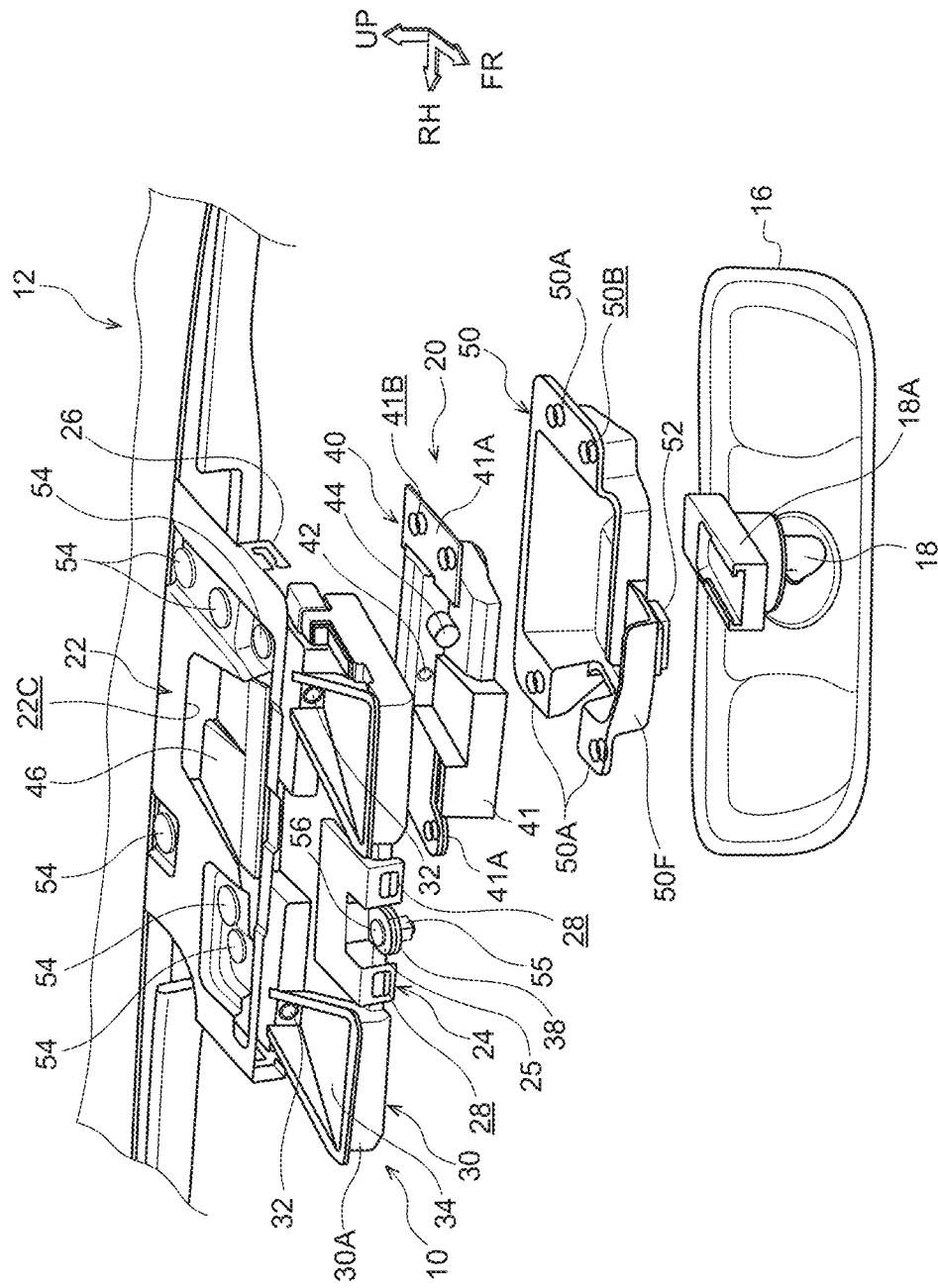
FIG. 1 is an exploded perspective view showing part of a camera unit equipped with a camera mounting structure pertaining to the embodiment.

An embodiment pertaining to the disclosure will be described in detail below based on the drawings. For convenience of description, arrow UP appropriately shown in the drawings indicates a vehicle upward direction, arrow FR indicates a vehicle forward direction, arrow RH indicates a vehicle rightward direction, and arrow LH indicates a vehicle leftward direction. Consequently, when the directions of upper/lower, front/rear, and right/left are used without further specification in the following description, these will be understood to mean upper/lower in the vehicle up and down direction, front/rear in the vehicle front and rear direction, and right/left in the vehicle right and left direction (vehicle width direction).

As shown in FIG. 1, a camera unit 20 equipped with a camera mounting structure 10 pertaining to the embodiment that is mounted to a vehicle 12 is provided on an inner surface of a front windshield glass 14 (see FIG. 2) on the vehicle front upper side of an electronic inner mirror 16 serving as an example of a display device that displays at least an image of what is in back of the vehicle 12.

Figure 2:
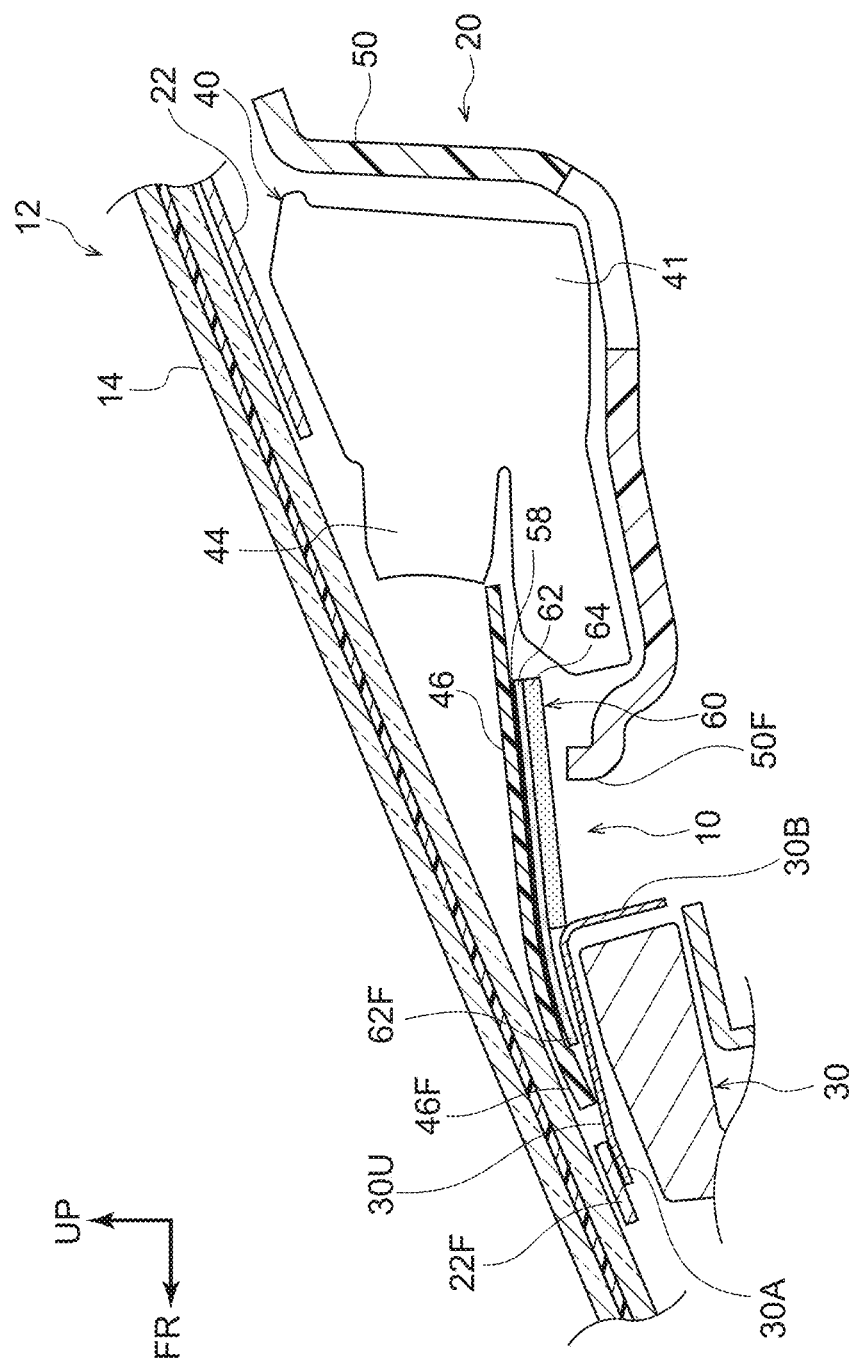
FIG. 2 is a side sectional view showing the camera mounting structure pertaining to the embodiment.
Figure 3:
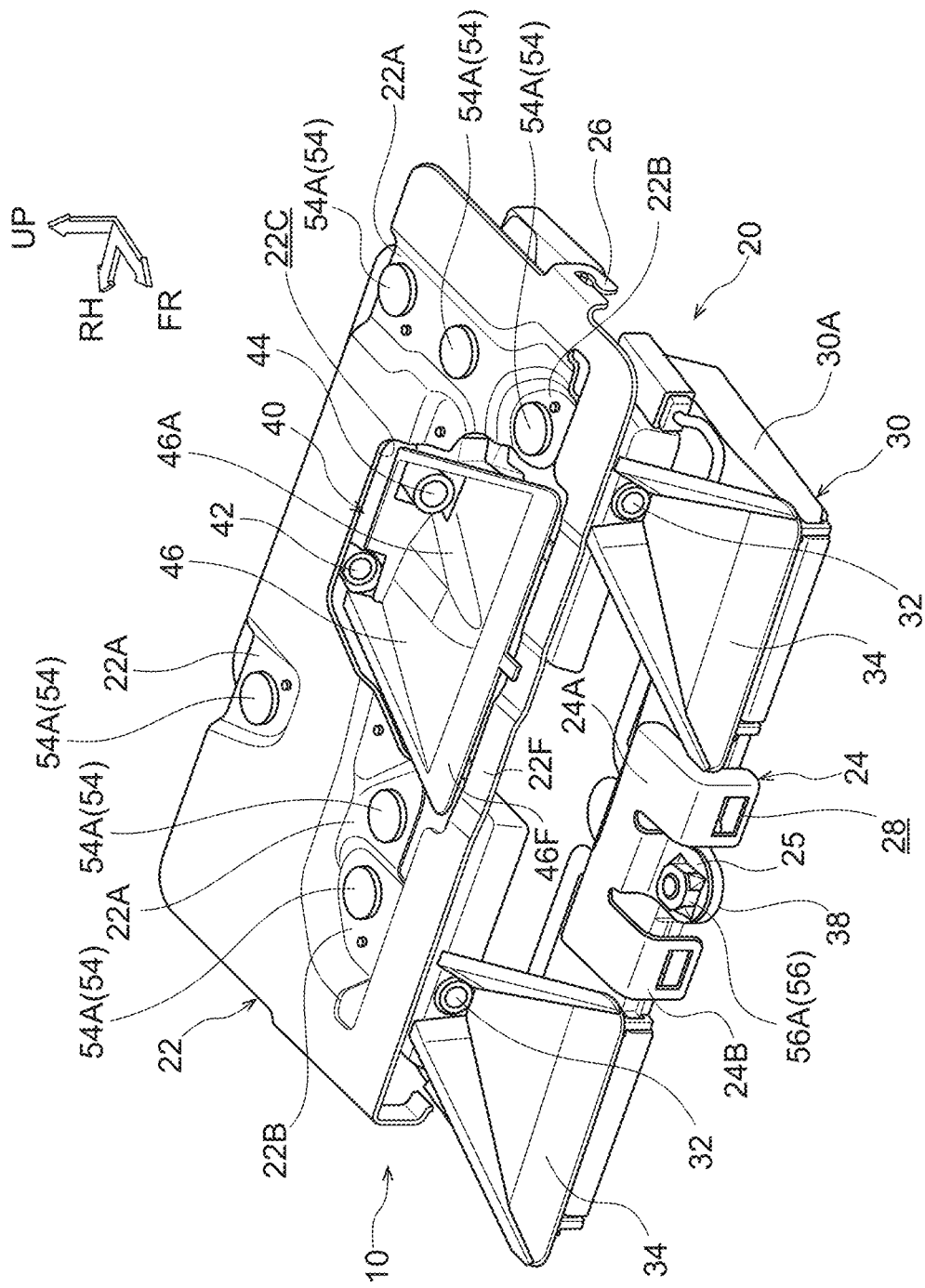
FIG. 3 is a perspective view showing, as seen from a vehicle upper side, the camera mounting structure pertaining to the embodiment.

As shown in FIG. 1 to FIG. 3, the camera unit 20 is equipped with a stereo camera device 30 serving as a sensor (a forward monitoring camera) and a locator/telephoto camera device 40 serving as a camera.

The stereo camera device 30 has a right and left pair of stereo cameras 32 that image the traveling environment in front of the vehicle 12 and detect information (positions, directions, distances, etc.) about the surroundings of the vehicle 12, and the stereo cameras 32 are provided apart from each other in the vehicle width direction in a device body 30A. The stereo camera device 30 is disposed more in the vehicle forward direction than a housing 50 that houses part of the locator/telephoto camera device 40.

The locator/telephoto camera device 40 has a locator camera 42 and a telephoto camera 44 for driving assistance (for autonomous driving) that image the traveling environment in front of the vehicle 12 and detect information (positions, directions, distances, etc.) about the surroundings of the vehicle 12. The locator camera 42 and the telephoto camera 44, which are a right and left pair of cameras, are provided in a device body 41 in closer proximity to each other in the vehicle width direction than the right and left stereo cameras 32 because they detect different information about the surroundings than the stereo cameras 32.

The camera unit 20 is equipped with a main bracket 22 that is attached to the inner surface of the front windshield glass 14. The main bracket 22 is attached by an adhesive or the like to the vehicle width direction middle portion of the vehicle upper side of the inner surface of the front windshield glass 14. The main bracket 22 is a bracket for attaching the rear end portion of the stereo camera device 30 and the locator/telephoto camera device 40 (the housing 50) and is formed of sheet metal in a substantially rectangular shape. An open portion 22C is formed in the main bracket 22 in the substantially middle portion thereof as seen in a plan view.

Specifically, recessed portions 22A are formed in the rear end portion of the main bracket 22 on both right and left sides thereof, and a through hole (not shown in the drawings) that is circular in shape as seen in a plan view is formed in the bottom surface of each recessed portion 22A. The left-side recessed portion 22A extends in the vehicle front and rear direction (its longitudinal direction coincides with the vehicle front and rear direction), and a through hole (not shown in the drawings) that is circular in shape as seen in a plan view is also formed in the front end portion of the left-side recessed portion 22A (the vehicle front and rear direction substantially middle portion of the main bracket 22).

A recessed portion 22A is also formed in the front portion (the portion disposed more rearward than a front end portion 22F) of the main bracket 22 on the right side thereof, and a through hole (not shown in the drawings) that is circular in shape as seen in a plan view is also formed in the bottom surface of the recessed portion 22A. Shaft portions (not shown in the drawings) of weld bolts 54 are inserted through the through holes in the recessed portions 22A, and head portions 54A of the weld bolts 54 are securely attached by welding to the bottom surfaces of the recessed portions 22A around the through holes.

Flange portions 41A (see FIG. 1) formed in the device body 41 of the locator/telephoto camera device 40 and flange portions 50A (see FIG. 1) formed in the housing 50 are jointly fastened (together fastened) to the main bracket 22 by these four weld bolts 54 and four nuts (not shown in the drawings).

Namely, through holes 41B, 50B (see FIG. 1) that are circular in shape as seen in a plan view and are for inserting the shaft portions of the weld bolts 54 therethrough are formed apart from each other in the vehicle front and rear direction in the flange portions 41A and the flange portions 50A, respectively, and the locator/telephoto camera device 40 and the housing 50 are fastened to the main bracket 22 at four places in front, back, right, and left.

A recessed portion 22B is formed on the vehicle width direction outer side in the bottom surface of the recessed portion 22A formed in the right front portion of the main bracket 22, and a through hole (not shown in the drawings) that is circular in shape as seen in a plan view is formed in the bottom surface of the recessed portion 22B. A shaft portion (not shown in the drawings) of a weld bolt 54 is inserted through the through hole, and a head portion 54A of the weld bolt 54 is securely attached by welding to the bottom surface of the recessed portion 22B around the through hole.

A recessed portion 22B is also formed on the vehicle front side in the bottom surface of the recessed portion 22A formed on the left side of the main bracket 22, and a through hole (not shown in the drawings) that is circular in shape as seen in a plan view is formed in the bottom surface of the recessed portion 22B. A shaft portion (not shown in the drawings) of a weld bolt 54 is inserted through the through hole, and a head portion 54A of the weld bolt 54 is securely attached by welding to the bottom surface of the recessed portion 22B around the through hole.

A right and left pair of flange portions (not shown in the drawings) are provided projecting in the vehicle rearward direction on both right and left sides of the rear end portion of the stereo camera device 30, and a through hole (not shown in the drawings) that is circular in shape as seen in a plan view is formed in each flange portion. The shaft portions of the weld bolts 54 provided in the recessed portions 22B are inserted through the through holes formed in the flange portions.

Namely, both right and left sides of the rear end portion of the stereo camera device 30 are fastened and secured to the main bracket 22 by these two weld bolts 54 and two nuts (not shown in the drawings). Because of this, a front wall 50F of the housing 50 is disposed in close proximity to a rear wall 30B of the stereo camera device 30 (the device body 30A) (see FIG. 2).

As shown in FIG. 1 and FIG. 3, the camera unit 20 is equipped with an auxiliary bracket 24 on the vehicle front side of the main bracket 22. The auxiliary bracket 24 is attached by an adhesive or the like to the vehicle width direction middle portion of the inner surface of the front windshield glass 14. The auxiliary bracket 24 is a bracket for attaching the front end portion of the stereo camera device 30 and is formed of sheet metal. The auxiliary bracket 24 is formed in a substantially rectangular shape that is smaller than the main bracket 22 as seen in a plan view.

Specifically, a tongue portion 25 is formed in the vehicle width direction middle portion of the front side of the auxiliary bracket 24 as a result of both sides thereof including the front end portion being cut out. The base portion of the tongue portion 25 is formed bent in such a way that the tongue portion 25 is disposed in a lower position (more in the vehicle downward direction) than an upper surface 24A of the auxiliary bracket 24, and a through hole (not shown in the drawings) that is circular in shape as seen in a plan view is formed in the middle of the tongue portion 25.

A shaft portion (not shown in the drawings) of a weld bolt 56 serving as a fastener that is a little smaller in diameter than the weld bolts 54 is inserted through the through hole, and a head portion 56A of the weld bolt 56 is securely attached by welding to the upper surface of the tongue portion 25 around the through hole.

A flange portion 38 is provided projecting in the vehicle forward direction in the middle portion of the front end portion of the stereo camera device 30, and a through hole (not shown in the drawings) that is circular in shape as seen in a plan view is formed in the flange portion 38. The shaft portion of the weld bolt 56 is inserted through the through hole formed in the flange portion 38.

Namely, the middle portion of the front end portion of the stereo camera device 30 is fastened and secured to the auxiliary bracket 24 by this one weld bolt 56 and one nut 55 (see FIG. 1), so the stereo camera device 30 is fastened to the auxiliary bracket 24 and the main bracket 22 at a total of three places—one place on the front side and two places on the rear side.

Catch receiving portions 26, which allow a right and left pair of rear-side catch claws (not shown in the drawings) provided on a cover (not shown in the drawings) that covers the stereo camera device 30 and the front-side portion of the housing 50 from the vehicle lower side to catch therein from the front side, are formed as a right and left pair on both vehicle width direction end portions of the main bracket 22.

Front end portions 24B of the auxiliary bracket 24 on both right and left sides of the tongue portion 25 are bent at right angles in the vehicle downward direction, and catch receiving holes 28, which allow a right and left pair of front-side catch claws (not shown in the drawings) provided on the cover to catch therein from the front side, are formed in the front end portions 24B.

As shown in FIG. 1 and FIG. 3, angle-of-view hood portions 34, each in the shape of an isosceles trapezoid that widens in the vehicle width direction heading in the vehicle forward direction as seen in a plan view, are integrally formed in the device body 30A of the stereo camera device 30 on the vehicle front sides of the stereo cameras 32. An angle-of-view hood member (hereinafter called "the hood member") 46, substantially in the shape of an isosceles trapezoid that widens in the vehicle width direction heading in the vehicle forward direction as seen in a plan view, is attached to the main bracket 22 so as to plug the open portion 22C.

The hood member 46 is formed of sheet metal in such a way that its height is different at its vehicle width direction substantially middle portion, so that the locator camera 42 side is in a higher position and the telephoto camera 44 side is in a lower position, because the hood member 46 is disposed on the front lower side of the locator camera 42 and the telephoto camera 44 and the telephoto camera 44 is disposed in a lower position than the locator camera 42. That is, a step portion 46A (see FIG. 3) is formed in the vehicle width direction substantially middle portion of the hood member 46.

The upper surface of a front end portion 46F of the hood member 46 does not contact (is contactless) the inner surface of the front windshield glass 14 (see FIG. 2). The hood member 46 is colored black, for example, to inhibit or prevent the reflection of light that has passed through the front windshield glass 14 (reflection into the locator camera 42 and the telephoto camera 44).

Figure 4:
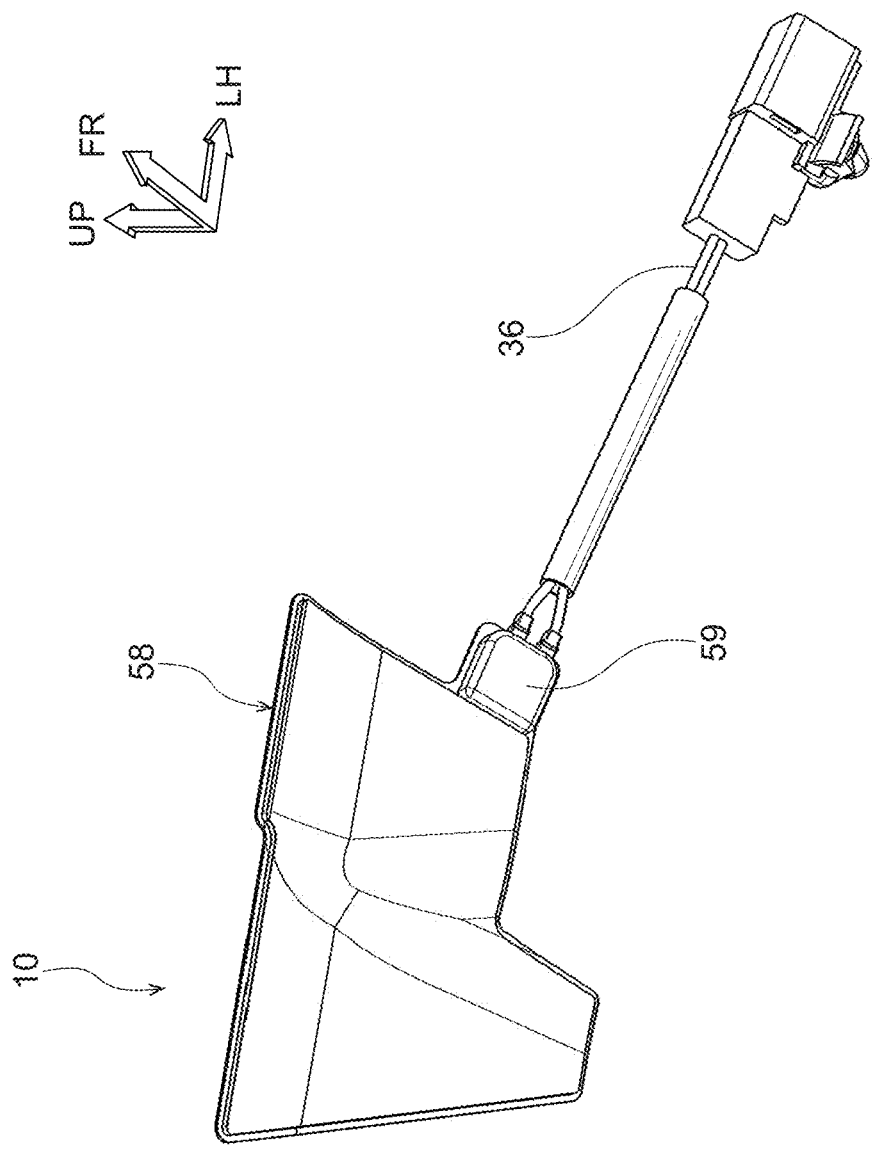
FIG. 4 is a perspective view showing, as seen from a vehicle lower side, a heater configuring the camera mounting structure pertaining to the embodiment.

As shown in FIG. 2, a heater 58 serving as a heating element is provided on, in a state in which its upper surface is in contact with (adhered to), the lower surface of the hood member 46. As shown in FIG. 4, the heater 58 is formed a size smaller than the hood member 46 and in substantially the same shape as the hood member 46, and a rectangular connector 59 to which a cable 36 for power is connected is integrally provided on the left end portion of the heater 58.

When the heater 58 emits heat, the hood member 46 made of metal becomes heated and the air around the hood member 46 becomes warmed, whereby defogging performance with respect to the front windshield glass 14 is ensured. As shown in FIG. 2, a heat-insulating member 60 formed in substantially the same shape as the heater 58 (the hood member 46) is provided on the lower surface of the heater 58 to ensure that the heat of the heater 58 does not escape (does not radiate) downward.

Figure 5:
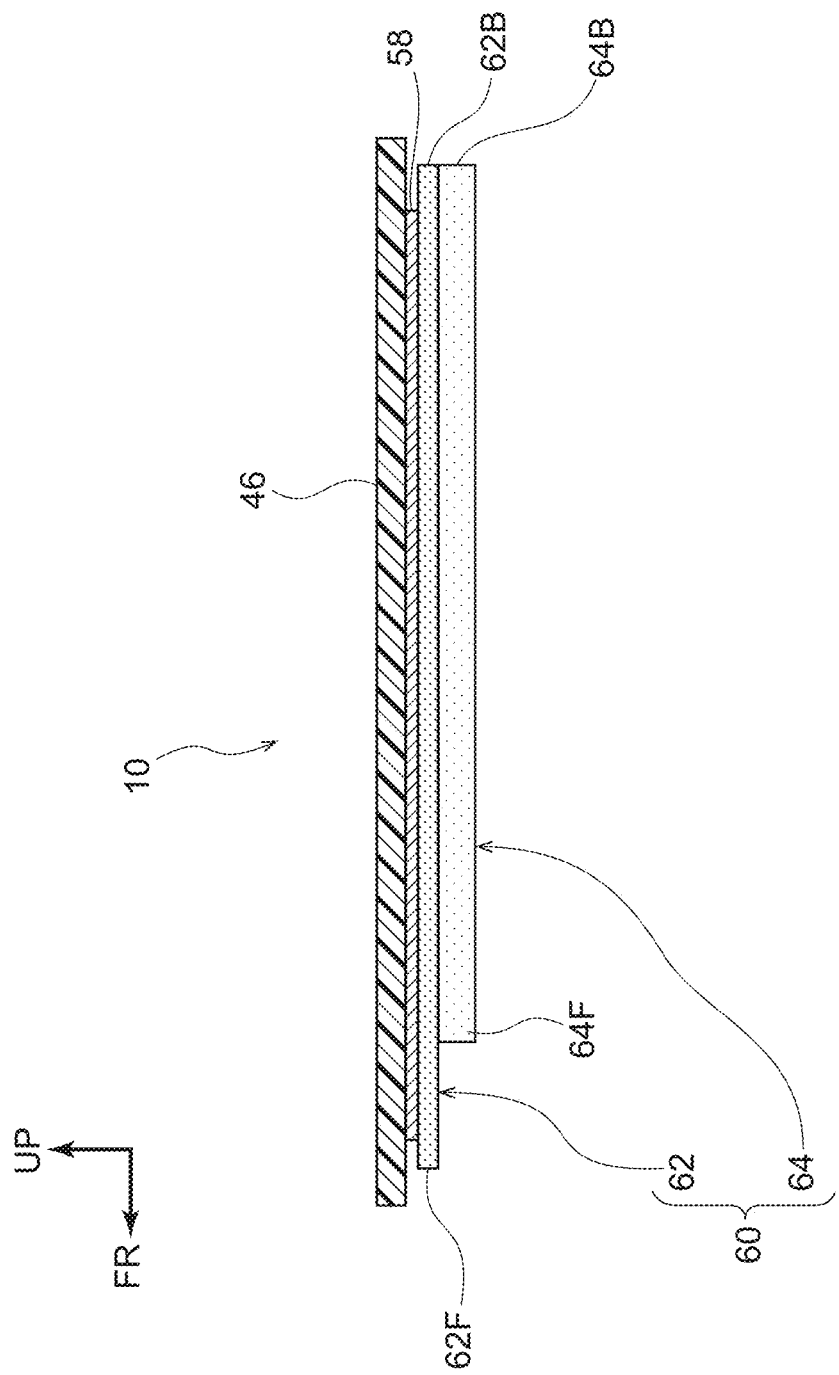
FIG. 5 is a sectional view of an angle-of-view hood member, a heater, and a heat-insulating member configuring the camera mounting structure pertaining to the embodiment.
Figure 6:
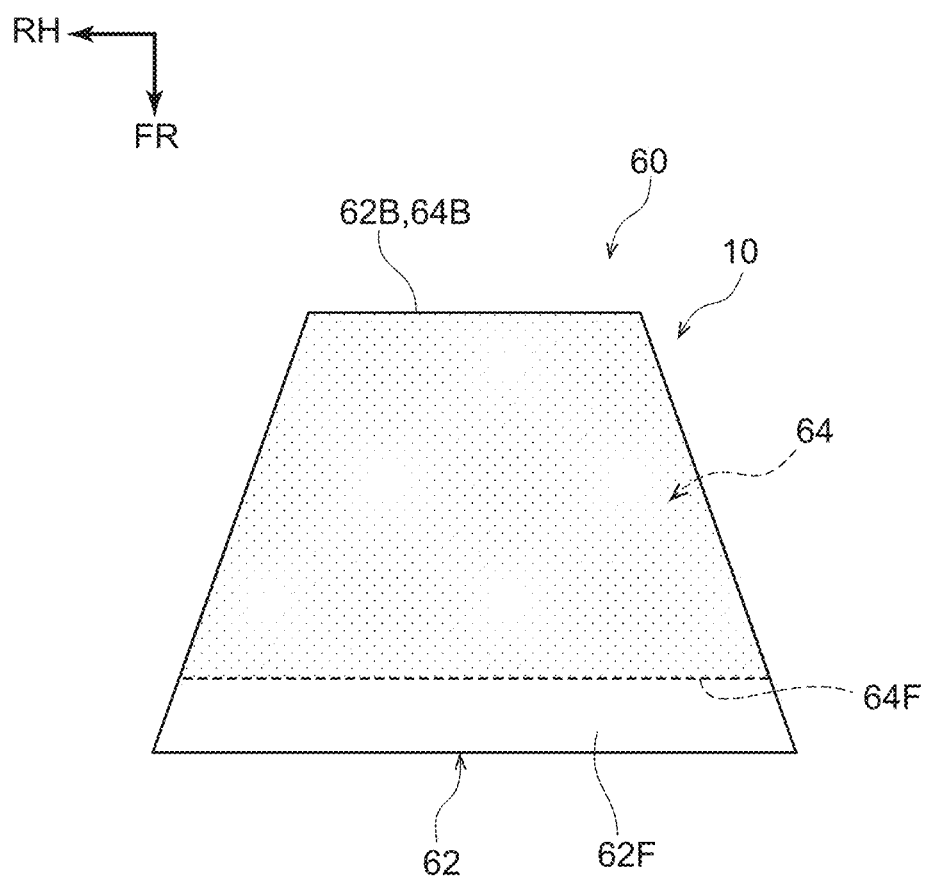
FIG. 6 is a plan view schematically showing the heat-insulating member configuring the camera mounting structure pertaining to the embodiment.

As shown in FIG. 5 and FIG. 6, the heat-insulating member 60 has a two-layer structure having an upper-layer heat-insulating material 62 and a lower-layer heat-insulating material 64 whose upper surface is adhered to the lower surface of the heat-insulating material 62. The upper-layer heat-insulating material 62 is formed in a size larger than the heater 58 and smaller than the hood member 46 as seen in a plan view, and its upper surface is adhered to the lower surface of the heater 58.

The lower-layer heat-insulating material 64 is formed in a size smaller than the heater 58. That is, as shown in FIG. 5 and FIG. 6, the upper-layer heat-insulating material 62 is formed longer in length in the vehicle front and rear direction than the lower-layer heat-insulating material 64 (the lower-layer heat-insulating material 64 is formed shorter in length in the vehicle front and rear direction than the upper-layer heat-insulating material 62).

In other words, when the upper-layer heating insulating material 62 and the lower-layer heat-insulating material 64 are placed on top of each other so that the vehicle front and rear direction positions of a rear end face 62B of the upper-layer heat-insulating material 62 and a rear end face 64B of the lower-layer heat-insulating material 64 are in the same position, a front end portion 62F of the upper-layer heat-insulating material 62 is disposed projecting in the vehicle forward direction beyond a front end portion 64F of the lower-layer heat-insulating material 64.

As shown in FIG. 2, part of the device body 30A of the stereo camera device 30—that is, an upper surface 30U on the rear wall 30B side—is disposed on the vehicle lower side of the upper-layer heat-insulating material 62 and on the vehicle front side of the lower-layer heat-insulating material 64. The front end portion 46F of the hood member 46 is disposed projecting in the vehicle forward direction beyond the front end portion 62F of the upper-layer heat-insulating material 62.

As shown in FIG. 1, a mirror bracket 52 for attaching the electronic inner mirror 16 is provided on the vehicle width direction substantially middle portion of the bottom wall of the housing 50. An upper end portion 18A of an arm member 18 of the electronic inner mirror 16 is attached to the mirror bracket 52, whereby the electronic inner mirror 16 is supported by the housing 50.

Next, the action of the camera mounting structure 10 pertaining to the embodiment having the above configuration will be described.

As shown in FIG. 4, the heater 58 formed a size smaller than the hood member 46 and in substantially the same shape as the hood member 46 is provided on, in a state in which its upper surface is in contact with (adhered to), the lower surface of the hood member 46. Consequently, the hood member 46 can be effectively heated by the heater 58.

Moreover, as shown in FIG. 5, the heat-insulating member 60 (the upper-layer heat-insulating material 62 formed in a size larger than the heater 58 and smaller than the hood member 46) is provided on the lower surface of the heater 58, so the heat of the heater 58 can be effectively inhibited from escaping (radiating) downward, and the hood member 46 can be efficiently heated.

In particular, when the upper-layer heat-insulating material 62 is formed in substantially the same shape as the hood member 46 as seen in a plan view, the heat of the heater 58 can be more effectively inhibited from escaping (radiating) downward, and the hood member 46 can be heated even more efficiently. Thus, the defogging performance of the heater 58 with respect to the front windshield glass 14 via the hood member 46 can be enhanced.

Heat damage to the stereo camera device 30 whose rear portion is disposed in close proximity to the heater 58 can also be inhibited by the upper-layer heat-insulating material 62 (the heat-insulating member 60). Furthermore, as shown in FIG. 5 and FIG. 6, the heat-insulating member 60 has a two-layer structure having the upper-layer heat-insulating material 62 and the lower-layer heat-insulating material 64. Consequently, the material and length of the heat-insulating member 60 can be adjusted with the respective layers.

Namely, when the heat-insulating member 60 is configured in this way, the heat-insulating member 60 can be slimmed compared to a case where the heat-insulating member 60 has a single-layer structure. Thus, the visibility of the occupants (including the driver and the occupant seated in the front passenger seat) can be inhibited from being reduced by the heat-insulating member 60.

Furthermore, as shown in FIG. 2, FIG. 5, and FIG. 6, the upper-layer heat-insulating material 62 projects in the vehicle forward direction beyond the lower-layer heat-insulating material 64, and part of the device body 30A of the stereo camera device 30 (the upper surface 30U on the rear wall 30B side) is disposed on the vehicle lower side of the upper-layer heat-insulating material 62 and on the vehicle front side of the lower-layer heat-insulating material 64 (the front end portion 62F of the upper-layer heat-insulating material 62 overlaps the upper surface U on the rear wall 30B side of the device body 30A).

Consequently, even in a case where the stereo camera device 30 is provided in addition to the locator/telephoto camera device 40, the length in the vehicle front and rear direction from the locator/telephoto camera device 40 to the stereo camera device 30 can be reduced, and installation space for installing the locator/telephoto camera device 40 and the stereo camera device 30 can be saved.

Namely, the vehicle upper side of the inner surface of the front windshield glass 14 can be compactly configured (can be slimmed to enhance layout). Thus, the visibility of the occupants (including the driver and the occupant seated in the front passenger seat) can be inhibited from being reduced by the camera unit 20.

The shape of the heat-insulating member 60 is not limited to the shape shown in FIG. 6. For example, there are cases where the horizontal angle of view of the locator camera 42 in the locator/telephoto camera device 40 is widened (to 100 degrees) more than the horizontal angle of view shown in FIG. 3. In that case, the locator camera 42 is disposed offset to the right side of the vehicle width direction center of the vehicle 12, so the right-side front end portion of the hood member 46 extends rightward in conformity with the curved shape of the front windshield glass 14.

In other words, the hood member 46 has a bilaterally asymmetrical shape in which the angle of inclination of its right-side edge portion is smaller than the angle of inclination of its left-side edge portion as seen in a plan view. However, if the shape of the heater 58 remains the same as the shape shown in FIG. 4, it becomes difficult for the right-side edge portion of the hood member 46 to be heated. Consequently, as shown in FIG. 7, the shape of the heat-insulating member 60 in that case is a shape conforming to the shape of the hood member 46, but a right-side front end portion 64R (a part with a predetermined width including the right-side corner portion that sticks out from the heater 58) of the lower-layer heat-insulating material 64 is not shortened but has the same length as the upper-layer heat-insulating material 62.

That is, the right-side front end portion 64R of the lower-layer heat-insulating material 64 is extended to the same length as a right-side front end portion 62R of the upper-layer heat-insulating material 62. Because of this, even when the shape of the heater 58 remains the same as the shape shown in FIG. 4, heat radiation under the right-side front end portion of the hood member 46 is inhibited, and a reduction in the heat transmitted to the right-side front end portion is inhibited. Thus, even in a case where the horizontal angle of view of the locator camera 42 is widened, defogging performance with respect to the front windshield glass 14 can be sufficiently ensured.

The camera mounting structure 10 pertaining to the embodiment has been described above based on the drawings, but the camera mounting structure 10 pertaining to the embodiment is not limited to what is shown in the drawings and can be appropriately changed in design in a range that does not depart from the spirit of the disclosure. For example, the positions of the locator camera 42 and the telephoto camera 44 may also be reversed in the right and left direction from the positions shown in the drawings. Needless to say, in that case, the shape of the hood member 46 is also reversed in the right and left direction.

Furthermore, it suffices for the upper-layer heat-insulating material 62 to be formed in a size larger than the heater 58 and smaller than the hood member 46 as seen in a plan view, and the upper-layer heat-insulating material 62 does not need to be formed in the same shape as the hood member 46 as seen in a plan view. Furthermore, the heat-insulating member 60 may also be integrally molded in the shape shown in the drawings rather than being configured by adhering the upper-layer heat-insulating material 62 and the lower-layer heat-insulating material 64 to each other.

What is claimed is:

1. A camera mounting structure comprising:
    a camera that is provided at a vehicle upper side of an inner surface of a front windshield glass and detects information about surroundings of a vehicle;
    an angle-of-view hood member made of metal that is disposed at a vehicle front lower side of the camera;
    a heating element that is provided at a lower surface of the angle-of-view hood member and is for defogging the front windshield glass; and
    a heat-insulating member that is provided at a lower surface of the heating element and has a two-layer structure having an upper-layer heat-insulating material and a lower-layer heat-insulating material.

2. The camera mounting structure according to claim 1, wherein:
    the upper-layer heat-insulating material of the heat-insulating member projects in a vehicle forward direction beyond the lower-layer heat-insulating material, and
    part of a sensor that detects information about the surroundings of the vehicle is disposed at a vehicle lower side of the upper-layer heat-insulating material and at a vehicle front side of the lower-layer heat-insulating material.

3. The camera mounting structure according to claim 1, wherein the upper-layer heat-insulating material is formed in a size that is larger than the heating element and smaller than the angle-of-view hood member as seen in a plan view.

4. The camera mounting structure according to claim 2, wherein the upper-layer heat-insulating material is formed in a size that is larger than the heating element and smaller than the angle-of-view hood member as seen in a plan view.

5. The camera mounting structure according to claim 3, wherein the upper-layer heat-insulating material is formed in substantially a same shape as the angle-of-view hood member as seen in a plan view.

6. The camera mounting structure according to claim 4, wherein the upper-layer heat-insulating material is formed in substantially a same shape as the angle-of-view hood member as seen in a plan view.

\* \* \* \* \*